United States Patent [19]
Okada

[11] Patent Number: 5,617,404
[45] Date of Patent: Apr. 1, 1997

[54] MAGNETO-OPTIC DISK APPARATUS PROVIDED WITH A HOLDER HAVING A CLAW CATCHING AND BENDING AN ELASTIC MEMBER

[75] Inventor: Yasushi Okada, Hadano, Japan

[73] Assignee: Ricoh Company, Ltd., Tokyo, Japan

[21] Appl. No.: 512,435

[22] Filed: Aug. 8, 1995

Related U.S. Application Data

[63] Continuation of Ser. No. 110,385, Aug. 23, 1993, abandoned.

[30] Foreign Application Priority Data

Aug. 27, 1992 [JP] Japan .................................. 4-228542

[51] Int. Cl.⁶ .............................. G11B 21/16; G11B 5/54
[52] U.S. Cl. ...................... 369/244; 369/75.1; 360/105
[58] Field of Search ............................ 369/13, 114, 244, 369/75.1; 360/99.02, 97.01, 105

[56] References Cited

U.S. PATENT DOCUMENTS

| | | | |
|---|---|---|---|
| 5,103,435 | 4/1992 | Nemoto et al. | 369/13 |
| 5,258,965 | 11/1993 | Sekine et al. | 369/13 |
| 5,331,611 | 7/1994 | Matsuba | 360/114 |

FOREIGN PATENT DOCUMENTS

| | | | |
|---|---|---|---|
| 524839 | 1/1993 | European Pat. Off. | 369/13 |
| 1130360 | 5/1989 | Japan . | |
| 210503 | 1/1990 | Japan . | |

*Primary Examiner*—Stuart S. Levy
*Assistant Examiner*—George Letscher
*Attorney, Agent, or Firm*—Cooper & Dunham LLP

[57] ABSTRACT

A magneto-optic disk apparatus is provided with a cartridge receiving a magneto-optic disk, a loading mechanism for moving a holder with the cartridge being set therein to an unloading position or to a loading position, and a magnetic head for applying a magnetic field in close vicinity to the magneto-optic disk, wherein the apparatus further has a support arm supporting the magnetic head and journaled as rotatable between a far position and a near position to the magneto-optic disk, a first elastic member for urging the support arm toward the far position, and a rotating member for rotating the support arm to the near position against an urging force of the first elastic member in synchronism with movement of the holder to the loading position and rotating the support arm to the far position by the urging force of the first elastic member in synchronism with movement of the holder to the unloading position.

4 Claims, 5 Drawing Sheets

MAGNETO-OPTIC DISK APPARATUS PROVIDED WITH A HOLDER HAVING A CLAW CATCHING AND BENDING AN ELASTIC MEMBER

This is a continuation of application Ser. No. 08/110,385 filed Aug. 23, 1993, now abandoned.

BACKGROUND OF THE INVENTION

1. Field of the Invention

The present invention relates to a magneto-optic disk apparatus in which a magnetic head applies a magnetic field onto a magneto-optic disk of record medium while a laser beam focused in fine beam spot is radiated to the disk, whereby information is recorded or erased, or whereby information recorded in magneto-optic disk is optically reproduced.

2. Description of the Related Art

Magneto-optic disk apparatus can record information at a high density in magneto-optic disk and make access in short time to desired information among information recorded in magneto-optic disk, and have recently been spreading at a high rate. Generally, a magneto-optic disk apparatus is provided with a moving mechanism of magnetic head for taking the magnetic head to the vicinity of a recording surface of magneto-optic disk in synchronism with a loading operation of magneto-optic disk and taking the magnetic head away from the magneto-optic disk in synchronism with an unloading operation thereof.

Japanese Patent Application Laying Open (Kokai) No. 1-130360 describes a magneto-optic disk apparatus provided with a magnetic bias slide mechanism. This slide mechanism is a moving mechanism composed of a pair of rails on which rollers provided in magnetic bias, which is a magnetic head, slide, a lever having a gear at the rotation center and engaging with the magnetic bias at a tip thereof to make the magnetic bias slide by rocking motion, a drive motor for rocking this lever, and a gear train meshing with the gear on the lever to transmit a rotational force of the drive motor to the lever.

In the magneto-optic disk apparatus as described in Japanese Patent Application Laying Open No. 1-130360, however, the magnetic bias slide mechanism needs the drive motor for sliding the magnetic bias and a mechanism for changing the rotational motion of the drive motor to a linear motion, which make the structure complicated. Further, the apparatus is so arranged that the magnetic bias is slid in the radial direction of magneto-optic disk to move between opposing position and non-opposing position to the magneto-optical disk, and therefore a space is necessary for withdrawal of magnetic bias in apparatus to secure the slide amount of magnetic bias in the movement direction. Therefore, it is difficult to make the main apparatus provided with magneto-optic disk apparatus more compact.

SUMMARY OF THE INVENTION

It is an object of the present invention to provide a magneto-optic disk apparatus, solving the above problems, which is simplified in mechanism for moving the magnetic head to the magneto-optic disk and which enables miniaturization of apparatus main body.

In the present invention, solving the above problems, a magneto-optic disk apparatus comprises a cartridge for receiving a magneto-optic disk, a loading mechanism for moving a holder with the cartridge being set therein to an unloading position or to, a loading position, and a magnetic head for applying a magnetic field in close vicinity to the disk, which is characterized by provision of a support arm supporting the magnetic head and journaled as rotatable between a far position and a near position to the magneto-optic disk, a first elastic member urging the support arm toward the far position, and a rotating member for rotating the support arm to the near position against an urging force of the first elastic member in synchronism with movement of the holder to the loading position and rotating the support arm to the far position by the urging force of the first elastic member in synchronism with movement of the holder to the unloading position.

The invention is further characterized in that the support arm is provided with a second elastic member for urging the magnetic head toward the magneto-optic disk at the near position.

The invention is further characterized in that the second elastic member is formed of a wire spring having flexibility.

The invention is further characterized in that the holder has a claw portion which catches the second elastic member and thereby bends it when the support arm is located at the near position.

The invention is further characterized in that the magnetic head is supported by the support arm while engaging with a fitting portion formed on the second elastic member.

According to the present invention, as described above, with the support arm supporting the magnetic head and rotatably journaled, the first elastic member for urging the support arm, and the rotating member for rotating the support arm in synchronism with movement of the holder, the support arm rotates to the near position with movement of the holder to the loading position and to the far position with movement of holder to the unloading position, whereby the magnetic head can approach or leave tile magneto-optic disk without any extra power source such as a motor. Further, with the second elastic member, which urges the magnetic head at the near position, the magnetic head is urged toward the magneto-optic disk when the holder is moved to the loading position, whereby the position of the magnetic head can be kept from fluctuating relative to the magneto-optic disk thereat. Moreover, with the second elastic member formed of a wire spring having flexibility, the magnetic head is urged toward the magneto-optic disk when the second elastic member is bent at the near position, whereby a space for elastic member can be reduced as compared for example with coil springs. In addition, with the claw portion provided on the holder and catching the second elastic member at the near position, the magnetic head is urged toward the magneto-optic disk, and further with the magnetic head engaging with the second elastic member, the magnetic head is supported by the support arm through the second elastic member, whereby no engagement members to the support arm are necessary in the magnetic head, reducing constituent components of magnetic head. Consequently, the moving mechanism of magnetic head may be made smaller, so that the apparatus main body may also be made smaller. Further, the moving mechanism of magnetic head is composed of less number of simple components, so that the production cost of apparatus main body can be reduced.

Further objects and advantages of the present invention will be apparent from the following description of the preferred embodiments of the invention as illustrated in the accompanying drawings.

DESCRIPTION OF THE PREFERRED EMBODIMENTS

The embodiments of the present invention will be described in detail with reference to the accompanying drawings.

Figure 1:
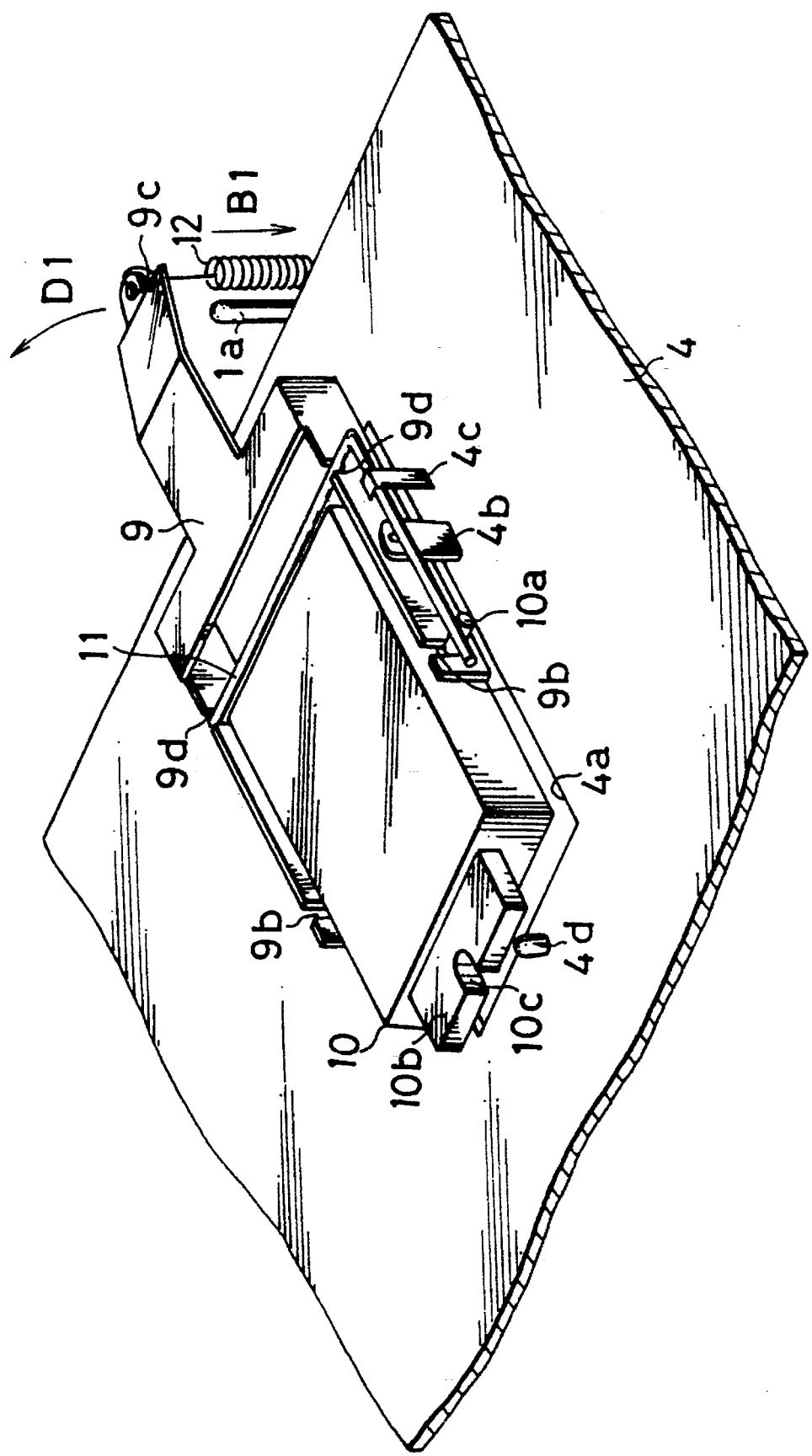
FIG. 1 is a perspective view to show the main part of a magneto-optic disk apparatus in an embodiment of the present invention.
Figure 2:
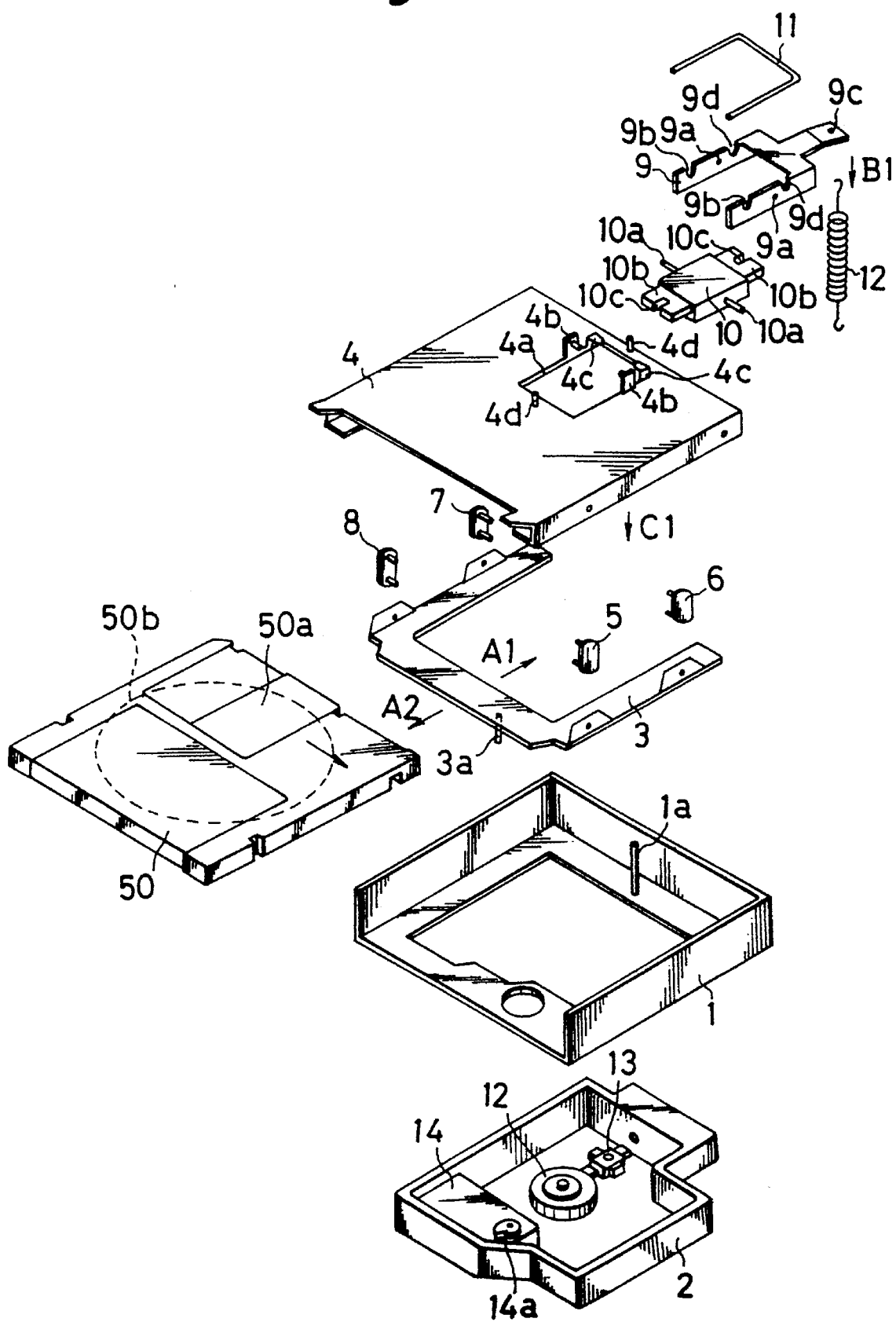
FIG. 2 is an exploded perspective view of the schematic structure of the present embodiment.

FIG. 1 is a perspective view to show a moving mechanism of magnetic head, which is the main part in magneto-optic disk apparatus as an example of the present invention, and FIG. 2 is an exploded perspective view of the structure in the present embodiment.

Reference numeral 1 designates a loading base, 2 a chassis closely fit to the lower surface of the loading base 1, 3 a carrier connected to the loading base 1 and urged in the direction of A1 by a spring omitted to show, 4 a holder connected to the carrier 3 through links 5, 6, 7, 8, and 50 a cartridge which is to be inserted into the holder 4 from the outside of apparatus which stores a magneto-optic disk 50b of disk shape inside.

Located inside the chassis 2 are a spindle motor unit 12 for chucking the magneto-optic disk 50b to rotate it, a moving optical system 13 provided with means for moving in the radial direction of magneto-optic disk 50b and irradiating the magneto-optic disk 50b with a focused laser beam, and a loading motor unit 14 rotating with a cam 14a in contact with a pin 3a vertically projecting from the lower surface of carrier 3.

A moving mechanism for magnetic head 10 is a mechanism which makes the magnetic head 10 approach or leave the magneto-optic disk 50b in cartridge 50 held by the holder 4 in synchronism with motion of holder 4, and the figures show a state that the holder 4 is located at the unloading position.

An opening portion 4a is formed on the upper surface of holder 4, and a pair of arm support portions 4b are located near the peripheral edge of the opening portion 4a. The arm support portions 4b are fit in holes 9a in the support arm 9, so that the support arm 9 is journaled therein.

The support arm 9 constitutes a lever with fulcrum at the holes 9a in which the arm support portions 4b are fit, U-shaped cutouts 9b open at upper end are formed near the fore end of support arm 9, and a hook hole 9c is formed near the rear end of support arm 9, in which an end of spring 12 as first elastic member as described below is hooked.

The pins 10a normally projecting from the both sides of the magnetic head 10 are fit in the cutouts 9b so that the magnetic head 10 is rotatably supported by the support arm 9. Located on the front face and on the rear face of magnetic head 10 are positioning plates 10b, which contact with the upper surface of holder 4 when the holder 4 is located at the loading position. A positioning hole 10c is formed in each positioning plate 10b, which comes to fit a positioning pin 4d vertically projecting from the upper surface of holder 4 when the positioning plates 10b contact with the upper surface of holder 4.

U-shaped cutouts 9d open at upper end are further formed between the holes 9a and the hook hole 9c in the support arm 9, and a wire spring 11, which is a second elastic member formed in the shape of U, is fit in the cutouts 9d. The spring 11 contacts with the pins 10a of magnetic head 10 at the tips thereof and is caught by claw portions 4c formed on the upper surface of holder 4 so that the spring 11 is held in the cutouts 9d in the contact state of tips with pins 10a.

A spring 12 is hooked in the hook hole 9c of support arm 9 at one end thereof and fixed on the loading base 1 at the other end while urging the support arm 9 in the direction of B1. The support arm 9 is held at the position as shown by the urging force of spring 12 and constructed as rotatable in the direction of D1 about the fulcrum of holes 9a against the urging force.

A user inserts a cartridge 50 from the outside into the holder 4 at the unloading position. Upon loading, an unrepresented shutter open and close mechanism opens a shutter 50a in synchronism with the insertion of cartridge 50 to make the magneto-optic disk 50b exposed. Then, the cam 14a in the loading motor unit 14 rotates to move the carrier 3 in the direction of A2. The holder 4 connected to the carrier 3 through the links 5, 6, 7, 8 moves toward the loading base 1 (in the direction of C1) in synchronism with the motion of carrier 3 and is then held at the loading position when the carrier 3 is stopped at a predetermined position.

At the loading position the spindle motor unit 12 chucks the magneto-optic disk 50b in cartridge 50 held by the holder 4, the moving optical system 13 is opposed to the lower surface of magneto-optic disk 50b, and the magnetic head 10 is in close vicinity to the upper surface of magneto-optic disk 50b. Upon recording or erasing information, a laser beam focused by the moving optical system 13 is radiated to the magneto-optic disk 50b while a magnetic field is applied thereto by the magnetic head 10. Upon reproducing information, the moving optical system 13 receives a laser beam reflected by the magneto-optic disk 50b as a reproduction signal.

Figure 3:
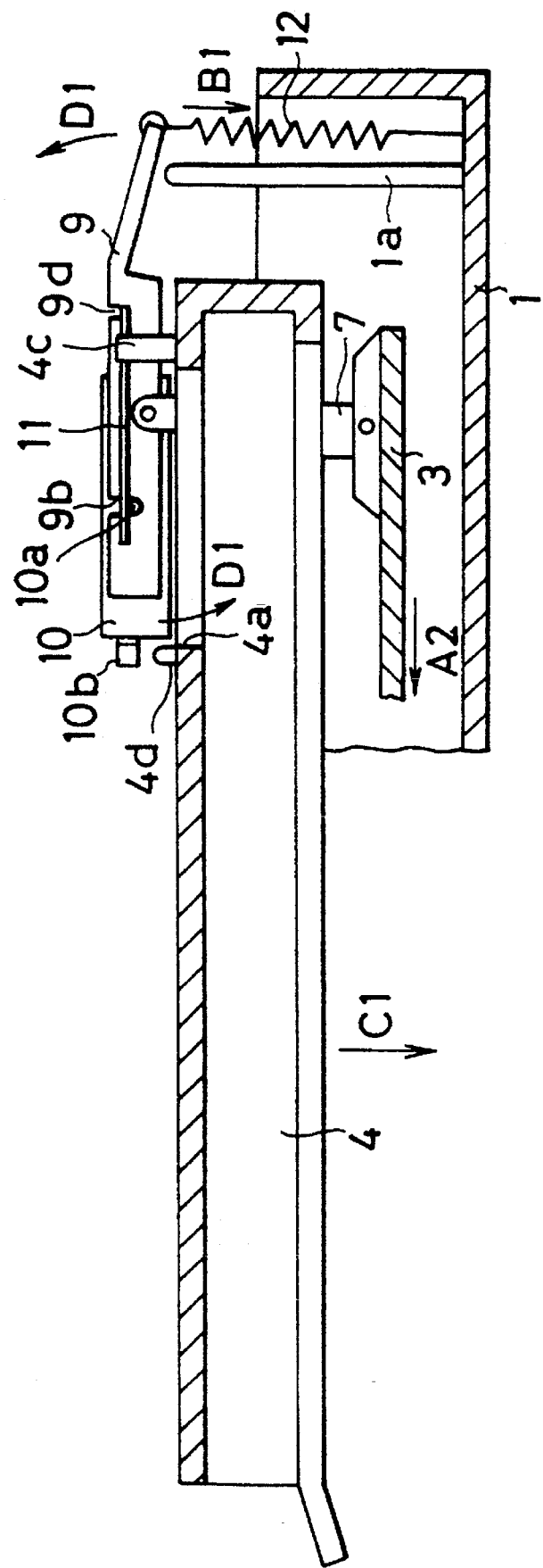
FIG. 3 is an explanatory drawing of the operation of the main part in the present embodiment.
Figure 4:
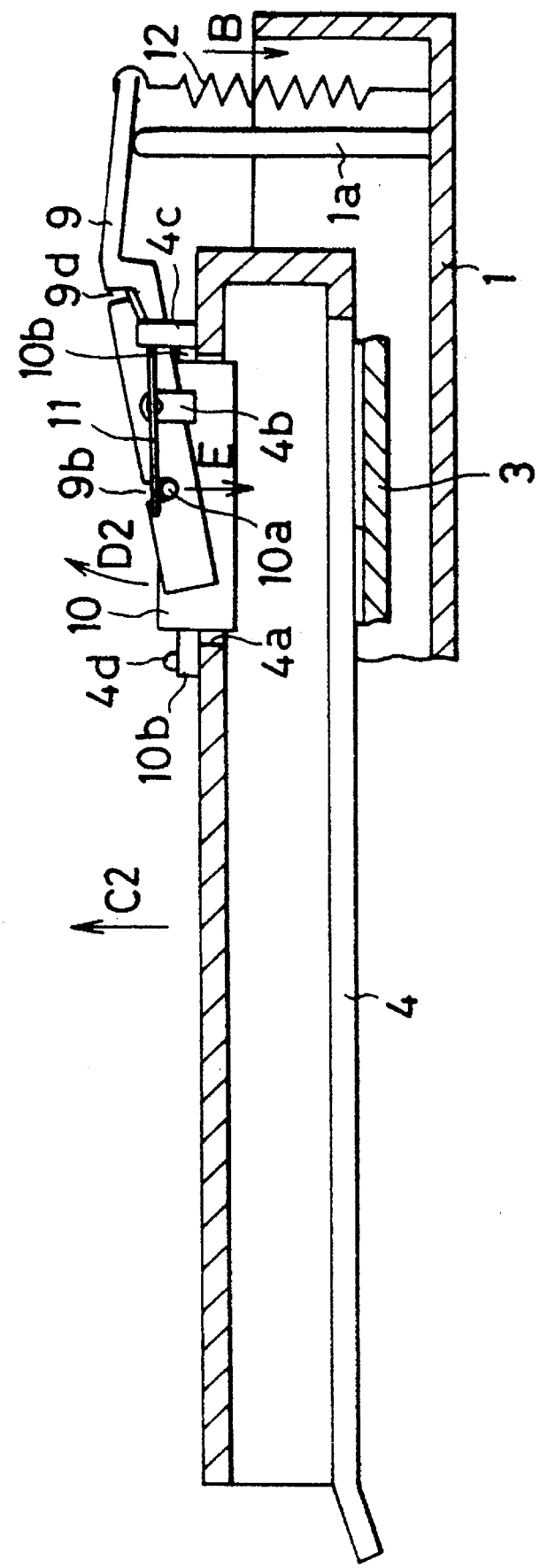
FIG. 4 is an explanatory drawing of the operation of the main part in the present embodiment.

FIG. 3 and FIG. 4 are explanatory drawings of the operation of the main part in the present embodiment.

FIG. 3 shows a state that the holder 4 is located at the unloading position, similarly as in FIG. 1. In this state, the support arm 9 is held at the position as shown by the urging force of spring 12, as described above, so as to hold the magnetic head 10 at the far position outside the holder 4.

The cartridge 50 is omitted in FIG. 3 and FIG. 4 for brevity of illustration. Once the cartridge 50 is inserted into the holder 4, the holder 4 starts moving in the direction of C1. The support arm 9 journaled on the holder 4 also starts moving in the direction of C1. A rotation pin 1a vertically projecting from the loading base 1 comes to contact with the support arm 9 near the hook hole 9c at the portion where the support arm 9 descends by a certain stroke. While the support arm 9 further descends, the rotation pin 1a rotates the support arm 9 in the direction of D1 in synchronism with the descent of support arm 9. The claw portions 4c of holder 4 bend the spring 11 in synchronism with the rotational motion of support arm 9.

FIG. 4 shows a state that the holder 4 is located at the loading position. In this state, the support arm 9 is held at the position as shown by the rotation pin 1a against the urging force of spring 12, and holds the magnetic head 10 at the near position such that the lower portion thereof is in the opening portion 4a of holder 4. The spring 11 bent at the near position elastically contacts with the pins 10a of magnetic head 10 to urge the magnetic head 10 in the direction of E. The magnetic head 10 urged by the spring 11 is fixed by the positioning plates 10b elastically contacting with the upper surface of holder 4 and by the positioning holes 10c in the positioning plates 10b fitting the positioning pins 4d of holder 4, whereby when the cartridge 50 is set in the holder 4 the magnetic head 10 is kept at constant position to the magneto-optic disk 50b so as to enable application of stable magnetic field of certain strength. The wire spring 11 can be disposed in a smaller space as compared to coil springs.

If the holder 4 moves from the loading position in the direction of C2, the support arm 2 rotates in the direction of D2 by the urging force of spring 12 to take the holder 4 to the unloading position, whereby the magnetic head is again held at the far position outside the holder 4.

Figure 5:
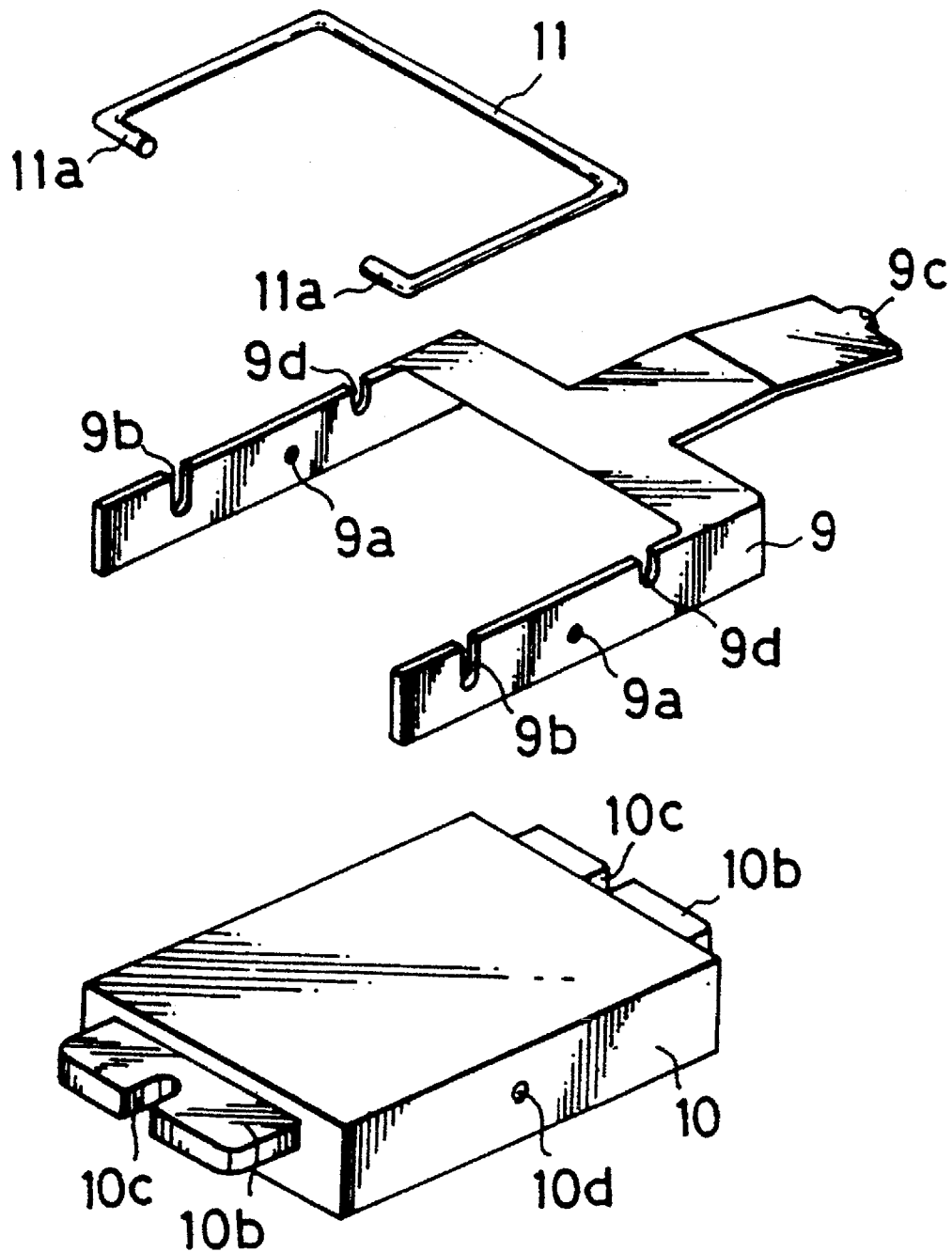
FIG. 5 is an exploded perspective view to show another example of magnetic head and spring in the present embodiment.

The moving mechanism of magnetic head 10 in the present embodiment keeps the magnetic head 10 outside the holder 4 when the holder 4 is at the unloading position, whereby the magnetic head 10 may be prevented from interfering with the cartridge 50 coming into the holder 4. When the holder 4 is at the loading position, the moving mechanism keeps the lower portion side of magnetic head 10 in the holder 4 so that a magnetic field of sufficient strength can be applied to the magneto-optic disk 50b upon recording or erasing. The moving mechanism obviates an extra power source such as a drive motor for moving the magnetic head 10 and is composed of the less number of components made of materials easy in processing, enabling reduction of production cost of apparatus main body. Further, the movement of magnetic head 10 is limited to the substantially vertical motion to the magneto-optic disk 50b, so that no space is necessary for withdrawing the magnetic head 10 in the horizontal direction, whereby the apparatus main body may be further miniaturized, FIG. 5 is an exploded perspective view to show another example of magnetic head and spring in the present embodiment. Members corresponding to those described with FIG. 1 to FIG. 4 are denoted by the same reference numerals and omitted to explain herein.

A fitting hole 10d is formed on either side face of magnetic head 10. Tip ends of spring 11 are bent inwardly to form fitting pin portions 11a.

The spring 11 is set on the support arm 9 while the rear end thereof is fit in the cutouts 9d of support arm 9. Further, the spring 11 rotatably supports the magnetic head while the fitting pin portions 11a are fit in the fitting holes 10d of magnetic head 10.

The fitting holes 10d of magnetic head 10 and the fitting pin portions 11a of spring 11 obviate members engaging with the support arm, such as pins provided on the side faces of magnetic head 10, which simplifies the assembling steps of magnetic head 10.

Many widely different embodiments of the present invention may be constructed without departing from the spirit and scope of the present invention. It should be understood that the present invention is not limited to the specific embodiments described in the specification, except as defined in the appended claims.

What is claimed is:

1. A magneto-optic disk apparatus provided with a cartridge receiving a magneto-optic disk, a loading mechanism for moving a holder with the cartridge being set therein to an unloading position or to a loading position, and a magnetic head for applying a magnetic field in close vicinity to said magneto-optic disk, wherein the apparatus comprises:

a support arm supporting said magnetic head and journaled as rotatable between a first position and a second position, said first position being in close vicinity to the magneto-optic disk and said second position being separate from the magneto-optic disk;

a first elastic member urging the support arm toward said second position; and a rotating member for rotating said support arm to said first position against an urging force of said first elastic member in synchronism with movement of said holder to said loading position and rotating the support arm to said second position by the urging force of the first elastic member in synchronism with movement of said holder to said unloading position, wherein said support arm is provided with a second elastic member to urge said magnetic head toward the magneto-optic disk at said first position and not to urge said magnetic head toward the magneto-optic disk at said second position, and said second elastic member is a U-shaped wire spring parallel to said magneto-optic disk, and wherein said holder is provided with a claw portion which catches and bends said second elastic member when said support arm is located at said first position.

2. A magneto-optic disk apparatus according to claim 1, wherein said magnetic head is supported by said support arm when engaging with a fitting portion formed on said second elastic member.

3. A magneto-optic disk apparatus provided with a cartridge receiving a magneto-optic disk, a loading mechanism for moving a holder with the cartridge being set therein to an unloading position or to a loading position, and a magnetic head for applying a magnetic field in close vicinity to said magneto-optic disk, wherein the apparatus comprises:

a support arm rotatably supported to said holder for supporting said magnetic head in such a manner that said magnetic head selectively takes one of a first position and a second position, said first position being in close vicinity of said magneto-optic disk, and said second position being apart from said magneto-optic disk;

a first elastic member urging the support arm toward said second position;

a second elastic member supplied to said support arm so as to urge said magnetic head toward the magneto-optic disk at said first position and not to urge said magnetic head toward the magneto-optic disk at said second position, said second elastic member being a U-shaped wire spring parallel to said magneto-optic disk; and a rotating member for rotating said support arm to said first position against an urging force of said first elastic member in synchronism with movement of said holder to said loading position and for rotating the support arm to said second position by the urging force of the first elastic member in synchronism with movement of the holder to said unloading position, wherein said holder is provided with a claw portion which catches and bends said second elastic member when said support arm is located at said first position.

4. A magneto-optic disk apparatus according to claim 3, wherein said magnetic head is supported by said support arm when engaging with a fitting portion formed on said second elastic member.

\* \* \* \* \*